J. M. KERN.
Seed-Dropper.
No. 16,209. Patented Dec. 9, 1856.
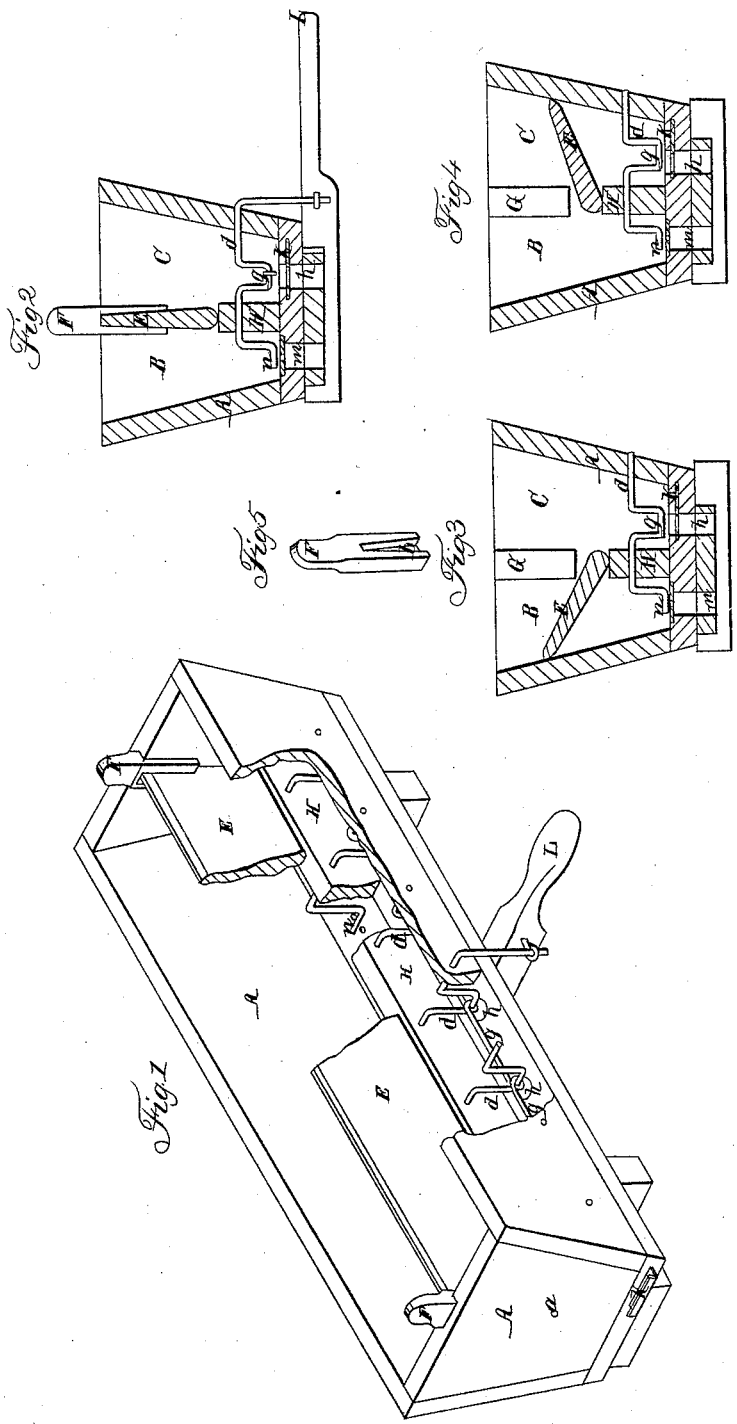

UNITED STATES PATENT OFFICE.

JAMES M. KERN, OF MORGANTOWN, VIRGINIA.

IMPROVEMENT IN SEEDING-MACHINES.

Specification forming part of Letters Patent No. 16,209, dated December 9, 1856.

*To all whom it may concern:*

Be it known that I, JAMES M. KERN, of Morgantown, in the county of Monongalia and State of Virginia, have invented certain new and useful Improvements in the Construction of Seed-Planters; and I do hereby declare that the following is a full, clear, and exact description thereof, reference being had to the accompanying drawings, making part thereof, in which—

Figure 1 represents a perspective view of the seed-box and agitators, parts of the sides and center-board being represented as broken out to show the parts behind. Figs. 2, 3, and 4 represent vertical cross-sections through the seed-box in its various changes from a double to a single box. Fig. 5 represents a perspective view of one of the key-slides, hereinafter to be described.

The nature of my invention relates to the so hinging of the partition or division board of the hopper of a seed-planter as will afford the means of sowing either one or two different kinds of seeds, or seeds and fertilizers, in any required proportion, at the same time.

To enable others skilled in the art to make and use my invention, I will proceed to describe its construction and operation.

Similar letters in the several figures refer to like parts.

A represents the seed-box or hopper. It is divided into two compartments by means of a center-board, E, which is pivoted to the two ends of the seed-box, as represented at $a$, Fig. 1, and can be turned to either side of the seed-box. This center-board can be fastened into a vertical position by inserting the key-slides F into grooves at the ends of the seed-box, the slides being themselves provided with grooves $b$, which receive the ends of the center-board E, as represented in Fig. 1. The movable center-board E rests with its lower edge on the permanent center-board H. Each of the compartments of the seed-box is provided with an apparatus for sowing. The compartment C is provided with a series of agitators, which are all connected together by rods $g$, and said agitators cause the seed to pass through the openings $h$, the size of which can be adjusted by means of the slides $k$. The apartment B is provided with a similar arrangement for dropping the seeds, but with the difference that the passages in the said compartment are smaller than in the former, as the one is intended for sowing large seed and the other for sowing small seed; or one side may sow seed and the other lime, guano, ashes, or other fertilizers.

The operation of this apparatus is as follows: For sowing coarse and fine seed, or seed and fertilizers, at the same time, the center-board E is secured as represented in Figs. 1 and 2. The compartments B and C being respectively filled with fine and coarse seed or other material, motion is imparted to the agitators $d$ and $n$ by vibrating the lever L by hand or by machinery, and the fine seed will pass through the passages $m$ and the coarse seed through the passages $h$, and thence drop to the ground.

If it is desired to sow fine seed only, then the slides F are withdrawn, and the center-board E is turned over the compartment B till its upper edge comes in contact with the side of the seed-box, as represented in Fig. 3, and the apparatus is transformed now into a single seed-planter for sowing coarse seed, and finally the apparatus can be changed into a single seed-planter for sowing fine seed by turning the center-board over the compartment C, as represented in Fig. 4.

This machine is designed more especially for sowing large and small grains together or separately, but may of course sow with any one kind of grain any of the dry manures or fertilizers; and it may be used as a hand or horse machine, as may be found desirable.

Having thus fully described the nature of my invention, what I claim therein as new, and desire to secure by Letters Patent, is—

The combining, with a seed-box provided with a double set of passages, substantially as described, a hinged center-board for the purpose of sowing both small or coarse grain separately, or both at the same time, or grain and fertilizers, as herein set forth.

JAMES M. KERN.

Witnesses:
GEORGE H. SPAHR,
PERRY C. RUDE.